(12) United States Patent
Pratt et al.

(10) Patent No.: US 8,976,891 B2
(45) Date of Patent: *Mar. 10, 2015

(54) MODULATION SIGNALS FOR A SATELLITE NAVIGATION SYSTEM

(75) Inventors: Anthony Richard Pratt, Brixworth (GB); John Ivor Rewbridge Owen, Farnborough (GB)

(73) Assignee: Secretary of State for Defence (GB)

( * ) Notice: Subject to any disclaimer, the term of this patent is extended or adjusted under 35 U.S.C. 154(b) by 1323 days.

This patent is subject to a terminal disclaimer.

(21) Appl. No.: 10/595,128

(22) PCT Filed: Sep. 1, 2004

(86) PCT No.: PCT/GB2004/003745
§ 371 (c)(1),
(2), (4) Date: Nov. 15, 2006

(87) PCT Pub. No.: WO2005/022186
PCT Pub. Date: Mar. 10, 2005

(65) Prior Publication Data
US 2007/0176676 A1    Aug. 2, 2007

(30) Foreign Application Priority Data

Sep. 1, 2003 (GB) .................................. 0320352.8

(51) Int. Cl.
*H04L 27/00* (2006.01)
*G01S 19/02* (2010.01)
*H04L 27/26* (2006.01)

(52) U.S. Cl.
CPC ............. *G01S 19/02* (2013.01); *H04L 27/2601* (2013.01)
USPC ............................ 375/295; 455/13.4; 342/352

(58) Field of Classification Search
USPC ............ 375/264, 286, 295; 342/352; 455/13.4
See application file for complete search history.

(56) References Cited

U.S. PATENT DOCUMENTS 3,328,798 A * 6/1967 Warfield et al. ............... 342/404
3,737,776 A * 6/1973 Fletcher et al. ............... 375/308

(Continued)

FOREIGN PATENT DOCUMENTS

EP       0458385 A2    11/1991
EP       0780974 A1    6/1997

(Continued)

OTHER PUBLICATIONS

Pratt, A. and Owen, J., "BOC Modulation Waveforms," ION GPS/GNSS, Portland, OR, (Sep. 9-12, 2003), pp. 1044-1057.

(Continued)

*Primary Examiner* — Jean B Corrielus
(74) *Attorney, Agent, or Firm* — Wilmer Cutler Pickering Hale and Dorr LLP

(57) ABSTRACT

Techniques for controlling a power spectrum of a navigation transmission signal in a navigation system are disclosed. In one particular embodiment, the techniques may be realized as a method of controlling a power spectrum of a navigation transmission signal in a navigation system, the navigation transmission signal comprising a carrier signal, a ranging code, a data signal, and at least one stepped subcarrier modulation signal. The method may comprise modulating the carrier signal by the at least one stepped subcarrier modulation signal, the data signal, and the ranging code to generate the navigation transmission ranging signal, wherein the at least one stepped subcarrier modulation signal may comprise a number, m, of amplitude levels, where m>2. The amplitude levels may be arranged to constrain the power spectrum of the navigation transmission signal in a predetermined manner.

19 Claims, 14 Drawing Sheets

(56) References Cited

U.S. PATENT DOCUMENTS

| | | | |
|---|---|---|---|
| 4,004,237 A * | 1/1977 | Kratzer | 327/156 |
| 4,206,462 A * | 6/1980 | Rabow et al. | 342/60 |
| 4,716,385 A * | 12/1987 | Noda et al. | 341/144 |
| 4,761,795 A | 8/1988 | Beier | |
| 4,809,006 A * | 2/1989 | Dar | 342/352 |
| 4,816,783 A * | 3/1989 | Leitch | 332/103 |
| 5,053,782 A * | 10/1991 | Levinberg et al. | 342/352 |
| 5,214,787 A | 5/1993 | Karkota, Jr. | |
| 5,239,670 A * | 8/1993 | Schwendeman et al. | 340/7.2 |
| 5,684,833 A * | 11/1997 | Watanabe | 375/286 |
| 5,717,722 A * | 2/1998 | Mori | 375/326 |
| 5,729,570 A | 3/1998 | Magill | |
| 5,745,535 A * | 4/1998 | Mori | 375/355 |
| 5,963,589 A * | 10/1999 | Nagano et al. | 375/224 |
| 6,009,087 A * | 12/1999 | Uchida et al. | 370/335 |
| 6,052,701 A * | 4/2000 | Koslov et al. | 708/313 |
| 6,150,978 A * | 11/2000 | McBurney | 342/357.62 |
| 6,301,306 B1 * | 10/2001 | McDonald et al. | 375/259 |
| 6,359,504 B1 | 3/2002 | Cozzarelli | |
| 6,381,536 B1 | 4/2002 | Satoh et al. | |
| 6,430,213 B1 * | 8/2002 | Dafesh | 375/146 |
| 6,574,285 B2 * | 6/2003 | Galins | 375/297 |
| 6,639,902 B2 | 10/2003 | Mennekens et al. | |
| 6,947,741 B2 * | 9/2005 | Beech et al. | 455/430 |
| 6,957,044 B2 * | 10/2005 | Beech et al. | 455/13.4 |
| 7,039,126 B2 * | 5/2006 | Galins | 375/298 |
| 7,120,198 B1 * | 10/2006 | Dafesh et al. | 375/261 |
| 7,272,416 B2 * | 9/2007 | Sano | 455/562.1 |
| 7,346,918 B2 | 3/2008 | Hennenhoefer et al. | |
| 7,561,103 B2 | 7/2009 | Lestarquit | |
| 7,583,759 B2 * | 9/2009 | Moulthrop et al. | 375/332 |
| 7,856,232 B2 * | 12/2010 | Nasta et al. | 455/427 |
| 2002/0070799 A1 * | 6/2002 | Dahan et al. | 330/10 |
| 2002/0136171 A1 * | 9/2002 | Mennekens et al. | 370/280 |
| 2002/0160795 A1 * | 10/2002 | Beech et al. | 455/504 |
| 2002/0161523 A1 | 10/2002 | Endo | |
| 2002/0164949 A1 * | 11/2002 | Beech et al. | 455/13.4 |
| 2003/0002593 A1 * | 1/2003 | Galins | 375/298 |
| 2003/0021358 A1 * | 1/2003 | Galins | 375/297 |
| 2003/0030508 A1 | 2/2003 | Wangsvick et al. | |
| 2003/0048901 A1 * | 3/2003 | Cangiani et al. | 380/252 |
| 2003/0141938 A1 * | 7/2003 | Poklemba et al. | 332/103 |
| 2003/0152387 A1 * | 8/2003 | Duling et al. | 398/81 |
| 2003/0204309 A1 | 10/2003 | Soellner | |
| 2003/0231580 A1 * | 12/2003 | Martin et al. | 370/203 |
| 2004/0057505 A1 | 3/2004 | Valio | |
| 2004/0131125 A1 * | 7/2004 | Sanderford et al. | 375/261 |
| 2004/0165652 A1 | 8/2004 | Schilling et al. | |
| 2006/0128343 A1 * | 6/2006 | Leblond et al. | 455/313 |
| 2007/0047637 A1 * | 3/2007 | Lee | 375/233 |
| 2012/0056781 A1 * | 3/2012 | Kong et al. | 342/357.42 |

FOREIGN PATENT DOCUMENTS

| | | |
|---|---|---|
| EP | 1021019 A1 * | 7/2000 |
| EP | 1021019 A1 | 7/2000 |
| JP | 2005-043193 A | 2/2005 |
| WO | WO 01/10070 | 2/2001 |
| WO | WO-2004/055541 A1 | 7/2004 |

OTHER PUBLICATIONS

Hein, G.W. et al., "Status of Galileo Frequency and Signal Design," Galileo (Publication 2002), 13 pages.

Newton's Telecom Dictionary, 11th Edition, p. 396, Jul. 1996.

Galileo, "European GNSS Open Service", Signal in Space Interface Control Document, Ref: OS SIS ICD, Issue 1.1, Sep. 2010, 206 pages.

Ries, L., et al., "A Software Simulation Tool for GNSS2 BOC Signals Analysis," Proceedings of the Institute of Navigation, Sep. 2002.

Betz, J., "The Offset Carrier Modulation for GPS Modernization," Proceedings of the Ion National Technical Meeting, The Institute of Navigation, 1999.

Gentile, K., "Fundamentals of Digital Quadrature Modulation," Feb. 2003.

* cited by examiner

300

600

800

900

MODULATION SIGNALS FOR A SATELLITE NAVIGATION SYSTEM

FIELD OF THE INVENTION

The invention relates to modulation signals, systems and methods such as, for example, navigation and positioning signals, systems and methods.

BACKGROUND OF THE INVENTION

Satellite Positioning Systems (SPS) rely on the passive measurement of ranging signals broadcast by a number of satellites, or ground-based or airborne equivalents, in a specific constellation or group of constellations. An on-board clock is used to generate a regular and usually continual series of events, often known as 'epochs', whose time of occurrence is coded into a random or pseudo-random code (known as a spreading code). As a consequence of the pseudo-random or random features of the time epoch encoding sequence, the spectrum of the output signal is spread over a frequency range determined by a number of factors including the rate of change of the spreading code elements and the waveform used for the spreading signal. Typically, the spreading waveform is rectangular and has a sinc function power spectrum.

The ranging signals are modulated onto a carrier signal for transmission to passive receivers. Applications are known that cover land, airborne, marine and space use. Typically, binary phase shift keying is employed to modulate the carrier signal, which, itself, has a constant magnitude. Usually, at least two such signals are modulated onto the same carrier in phase quadrature. The resulting carrier signal retains its constant envelope but has four phase states depending upon the two independent input signals. However, it will be appreciated that two modulating signals do not need to have the same carrier magnitude. It is possible for a constant carrier magnitude of the combined signal to be maintained by appropriate selection of corresponding phases other than $\pi/2$ radians.

An example of such a satellite positioning system is the Global Positioning System (GPS). Generally, the GPS operates using a number of frequencies such as, for example, L1, L2 and L5, which are centred at 1575.42 MHz, 1227.6 MHz and 1176.45 MHz respectively. Each of these signals is modulated by respective spreading signals. As will be appreciated by those skilled in the art, a Coarse Acquisition (CA) code signal emitted by the GPS Satellite Navigation System is broadcast on the L1 frequency of 1575.42 MHz with a spreading code rate (chip rate) of 1.023 MHz. The CA has a rectangular spreading waveform and is categorised as BPSK-R1. The GPS signal structure is such that the signal broadcast by the satellites on the L1 frequency has a second component in phase quadrature, which is known as the precision code (P(Y) code) and made available to authorised users only. The P(Y) signal is BPSK modulated with a spreading code at 10.23 MHz with a magnitude which is 3 dB lower in signal power than the CA code transmission. Consequently, the Q component has a magnitude which is 0.7071 (−3 dB) of the magnitude of the I component. It will be appreciated by those skilled in the art that the phase angles of these states of these signals are ±35.265° in relation to the ±I axis (phase of the CA code signal as specified in ICD GPS 200C). One skilled in the art also appreciates that the P code is a function of or is encrypted by the Y code. The Y code is used to encrypt the P code. One skilled in the art appreciates that the L1 signal, containing both I & Q components, and the L2 signal can be represented, for a given satellite, i, as $$S_{L1i}(t) = A_P P_i(t) d_i(t) \cos(\omega_1 t) + A_C c_i(t) d_i(t) \sin(\omega_1 t), \text{ and}$$

$$S_{L2i}(t) = B_P P_i(t) d_i(t) \cos(\omega_2 t)$$

where $A_P$ and $A_C$ are the amplitudes of the P and CA codes, typically $A_P = 2A_C$;

$B_P$ is the amplitude of the L2 signal;

$\omega_1$ and $\omega_2$ are the L1 and L2 carrier frequencies;

$p_i(t)$ represents the P(Y) ranging code and is a pseudo-random sequence with a chip rate of 10.23 Mcbps. The P code has a period of exactly 1 week, taking values of +1 and −1;

$c_i(t)$ represents the CA ranging code and is a 1023 chip Gold code, taking values of +1 and −1;

$d_i(t)$ represents the data message, taking values of +1 and −1.

A satellite constellation typically comprises 24 or more satellites often in similar or similarly shaped orbits but in a number of orbital planes. The transmissions from each satellite are on the same nominal carrier frequency in the case of code division access satellites (such as GPS) or on nearby related frequencies such as GLONASS. The satellites transmit different signals to enable each one to be separately selected even though several satellites are simultaneously visible.

The signals from each satellite, in a CDMA system like GPS, are distinguished from each one another by means of the different spreading codes and/or differences in the spreading code rates, that is, the $p_i(t)$ and $c_i(t)$ sequences. Nevertheless, as will be appreciated from the power spectrum 100 shown in FIG. 1 there remains significant scope for interference between the signals transmitted by the satellites. FIG. 1 shows power spectra 100 for the CA and P(Y) codes. The power spectrum 102 for the CA code has maximum power at the carrier frequency L1 and zeros at multiples of the fundamental frequency, 1.023 MHz, of the CA code. For example, it can be appreciated that zeros occur either side of the carrier frequency at ±1.023 MHz, ±2.046 MHz etc. Similarly, the power spectrum 104 for the P(Y) code has a maximum amplitude centred on the L1 and L2 frequencies, with zeros occurring at multiples of ±10.23 MHz as is expected with a sine function waveform.

It is known to further modulate the ranging codes using a sub-carrier, that is, a further signal is convolved with the P codes and/or CA codes to create Binary Offset Carrier (BOC) modulation as is known within the art see, for example, J. W. Betz, "*Binary Offset Carrier Modulation for Radionavigation*", Navigation, Vol. 48, pp 227-246, Winter 2001-2002. Standard BOC modulation 200 is illustrated in FIG. 2. FIG. 2 illustrates the combination of a portion of a CA code 202 with a subcarrier signal to produce the BOC signal 204 used to modulate a carrier such as, for example, L1. It can be appreciated that the BOC signal is a rectangular square wave and can be represented as, for example, $c_i(t)*\text{sign}(\sin(2\pi f_s t))$, where $f_s$ is the frequency of the subcarrier. One skilled in the art understands that BOC($f_s$, $f_c$) denotes Binary Offset Carrier modulation with a subcarrier frequency of $f_s$ and a code rate (or chipping rate) of $f_c$. Using binary offset carriers results in the following signal descriptions of the signals emitted from the satellite:

$$S_{L1i}(t) = A_m sc_{im}(t) m_i(t) d_i(t) \cos(\omega_1 t) + A_c sc_{ig}(t) g_i(t) d_i(t)$$
$$\sin(\omega_1 t) = I_{SL1i}(t) + Q_{SL1i}(t), \text{ and}$$

$$S_{L2i}(t) = B_m sc_{im}(t) m_i(t) d_i(t) \cos(\omega_2 t)$$

where $A_m$, $A_c$ and $B_m$ are amplitudes;

$m_i(t)$ is an m-code BOC(10,5) signal;

$g_i(t)$ is a Galileo open service range code;

$sc_{im}(t)$ represents the sub-carrier signal for $m_i(t)$;

$sc_{ig}(t)$ represents a subcarrier signal for $g_i(t)$; and $\omega_1$ and $\omega_2$ are the L1 and L2 carrier frequencies;

FIG. 2 also illustrates power spectra for a BPSK-R1 code and pair of BOC signals, that is, BOC(2,1) and BOC(10,5). The first spectrum 202 corresponds to BPSK-R1 code. The second power spectrum 204 corresponds to the BOC(2,1) code and the third power spectrum 206 corresponds to the BOC(10,5) code. It can be appreciated that the side lobes 208 of the BOC(2,1) signal have a relatively large magnitude. Similarly, the illustrated side lobe 210 of the BOC(10,5) signal has a relatively large magnitude. One skilled in the art appreciates that the energy in the side lobes are a source of interference.

It is an object of embodiments of the present invention to at least mitigate the problems of the prior art.

SUMMARY OF INVENTION

Accordingly, a first aspect of embodiments of the present invention provides an m-level modulation signal comprising m signal amplitudes, where m>2, for modulating a first signal.

A second aspect of embodiments of the present invention provides a method of generating a transmission signal comprising a carrier signal, the method comprising the step of combining a plurality of subcarrier modulation signals with the carrier signal.

A third aspect of embodiments of the present invention provides a ranging system comprising means for generating a ranging code; means for generating a signal; means for transmitting the signal.

A fourth aspect of embodiments of the present invention provides a system comprising memory for storing at least one of a plurality of selectable phase states and selectable amplitude states; the memory being responsive to at least one of a ranging code signal, a system clock signal and a subcarrier signal to produce a carrier signal bearing at least one of phase and amplitude modulation to produce a transmission signal.

Advantageously, embodiments of the present invention provide significantly more control over the shape of the power spectra of signals, that is, the distribution of energy within those signals.

Other aspects of the present invention are described and defined in the claims.

BRIEF DESCRIPTION OF THE INVENTION

Embodiments of the present invention will now be described, by way of example, only with reference to the accompanying drawings in which.

DETAILED DESCRIPTION OF THE DRAWINGS

Figure 1:
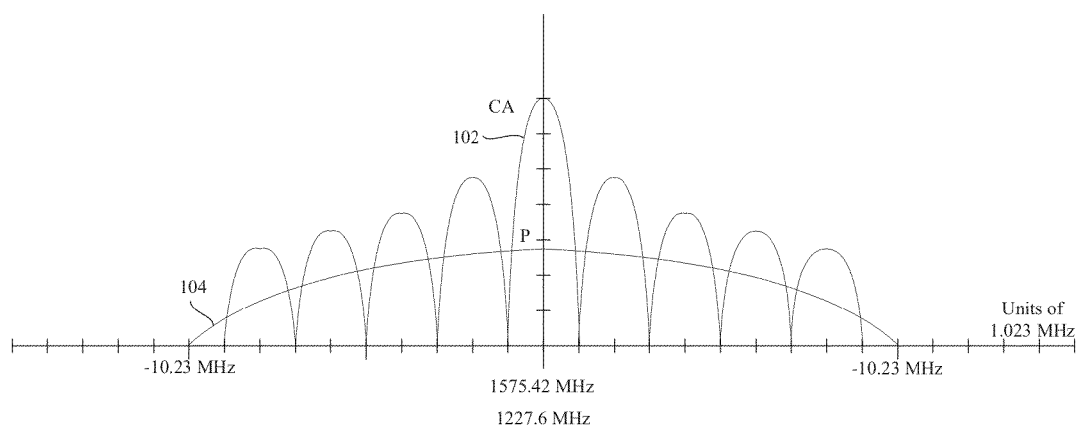
FIG. 1 shows a power spectrum of a pair of ranging code.
Figure 2:
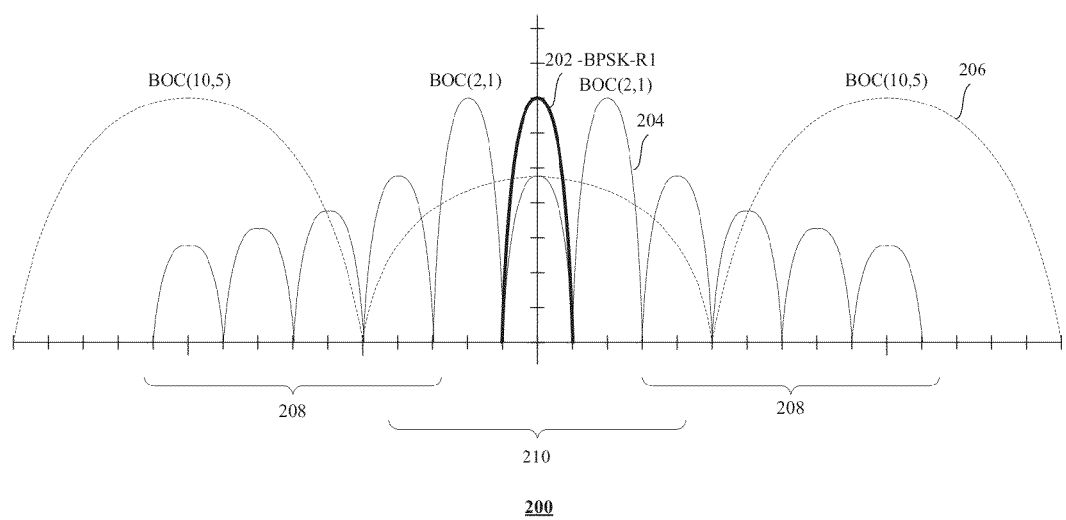
FIG. 2 illustrates power spectra of a ranging code (BPSK-R1) and BOC(10,5) signals.
Figure 3:
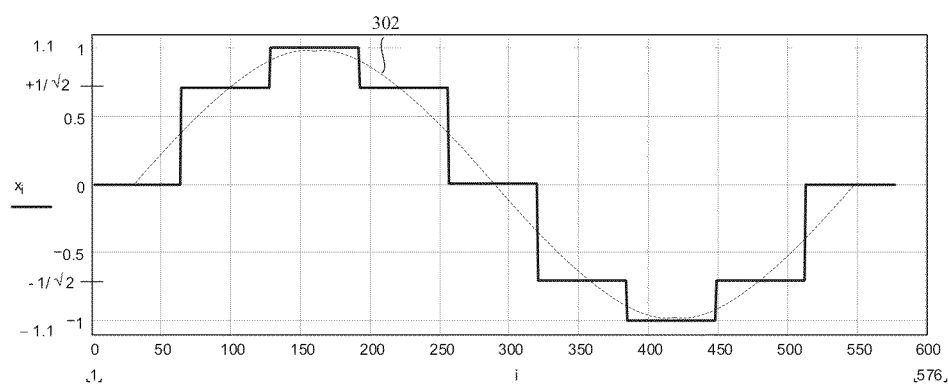
FIG. 3 illustrates a multi-level sub-carrier.

Referring to FIG. 3, there is shown a first embodiment of a subcarrier 300. It can be appreciated that the sub-carrier is a 5-level approximation of a sinusoidal signal 302. It can be appreciated that the signal levels are $(+1, +1/\sqrt{2}, 0, -1/\sqrt{2}, -1)$. Furthermore, it will be appreciated that the levels are the projections onto the x or I axis of a rotating vector at angles of $\pi/4$ radians having a unit magnitude. It will be further appreciated that, given the in-phase and quadrature-phase components of, for example, $S_{L1i}$, that is, $A_m sc_{im}(t)m_i(t)d_i(t)\cos(\omega_i t) = I_{SL1i}(t)$ and $A_C sc_{ig}(t)g_i(t)d_i(t)\sin(\omega_1 t) = Q_{SL1i}(t)$, the magnitude of the signal will be such that it is constant since the projection of the quadrature phase component onto the y or Q axis will also take the values $(+1, +1/\sqrt{2}, 0, -1/\sqrt{2}, -1)$.

Figure 4:
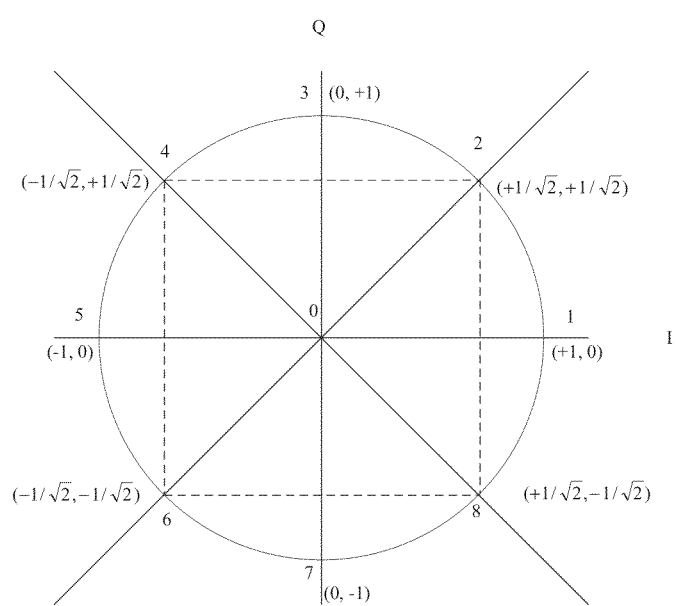
FIG. 4 illustrates the phase states for at least a pair of multilevel subcarriers according to embodiments of the present invention.

It will be appreciated that there are preferably restrictions on the combinations of signals, at least one of which is that a constant modulus signal should be maintained. The constraints are (1) that "+1" or "−1" on the in-phase component can only occur in conjunction with "0" on the quadrature phase component and visa versa and (2) "±1/√2" can only occur on both phases simultaneously. The magnitudes of the in-phase and quadrature phase components of the spreading signals, $sc_{ig}(t)$ or $sc_{im}(t)$, can be plotted on an Argand diagram 400 such as is shown in FIG. 4. The waveforms for the I and Q components are thus built from the following signal element sequences:

I phase—$(+1/\sqrt{2}, +1, +1/\sqrt{2}, 0)$ representing a +1 signal

I phase—$(-1/\sqrt{2}, -1, -1/\sqrt{2}, 0)$ representing a −1 signal

Q phase—$(+1/\sqrt{2}, 0, -1/\sqrt{2}, -1)$ representing a +1 signal

Q phase—$(-1/\sqrt{2}, 0, +1/\sqrt{2}, +1)$ representing a −1 signal.

Any combination of I or Q signal sequences can be chosen from the above set within the constraint of a constant magnitude carrier signal, computed as $(I^2+Q^2)^{1/2}$. It will be clear to those skilled in the art, that there are many other equivalent sets of sequences which may be chosen from the set of 5-levels satisfying the criterion of a constant carrier envelope. It can be appreciated that the magnitudes of the subcarriers on the I and Q channels can be thought of as being analogous to the states of an 8-PSK signal. Therefore, such a pair of 5-level subcarrier carrier signals can be thought of as 8 phase subcarrier signals.

Figure 5:
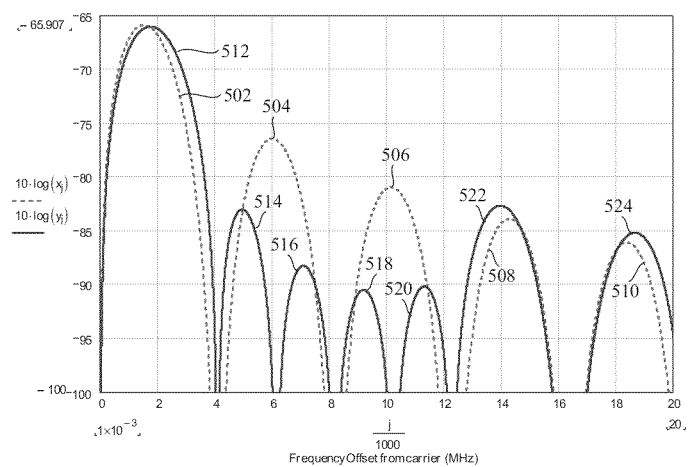
FIG. 5 depicts a power spectrum of a prior art subcarrier and a subcarrier according to embodiments of the present invention.

FIG. 5 illustrates the effect of using a stepped or m-level, m>2, subcarrier waveform. Referring to FIG. 5 there is shown a pair 500 of power spectra. The first power spectrum 502, illustrated using the dotted line, represents the spectrum of a BOC(2,2) subcarrier. It can be appreciated that the energy of the subcarrier is contained within progressively reducing side lobes 504, 506, 508 and 510. The second power spectrum 512 represents the power spectrum of a BOC(2,2) signal that used 8 phase subcarrier signals, that is, 8 phase amplitudes, represented by BOC8(2,2). More generally, BOCm($f_s$, $f_c$) represents an m-phase subcarrier signal of having a frequency off, and a chipping rate of $f_c$. It can be appreciated that the spectrum 512 of the BOC8(2,2) signal has a number of side lobes 514, 516, 518, 520, 522 and 524. Of those side lobes, it can be seen that the $1^{st}$ to $4^{th}$ side lobes are significantly reduced, that is, they comprise significant less energy, as compared to the side lobes of the BOC(2,2) signal spanning the same frequencies. The significant reduction in the $1^{st}$ to $4^{th}$ side lobes can be beneficial in situations in which one skilled in the art wishes to use the frequency spectrum spanned by the side lobes for other transmissions.

It will be appreciated by those skilled in the art the BOC8 (2,2) has significantly improved interference properties as determined using Spectral Separation Coefficients (SSC) and self-SSCs as is well understood by those skilled in the art, that is, the spectral coupling between a reference signal and BOC (2,2) is greater than the spectral coupling between a reference signal and BOC8(2,2). For example, a BOC8(2,2) signal exhibits a 10-12 dB improvement in spectral isolation as compared to a conventional BOC(2,2) signal. Further information on the relationship between SSC and signals according to embodiments of the present invention can be found in, for example, Pratt & Owen; BOC Modulation Waveforms, IoN Proceedings, GPS 2003 Conference, Portland, September 2003, which is incorporated herein by reference for all purposes.

Furthermore, embodiments of the present invention utilise the magnitude and duration of the subcarrier to influence, that is, control the energy in harmonics of the resulting modulating waveform. For example, referring still to FIG. 5, it can be appreciated that additional spectral nulls appear in the BOC8 (2,2) spectrum at substantially 6 MHz and 10 MHz offset from the carrier whereas there are no such nulls in the conventional BOC(2,2) signal. The location of the nulls is influenced by at least one of the magnitude and duration of the steps in the multilevel subcarrier. More specifically, the nulls can be steered to desired locations by changing either of these two elements, that is, the position of the nulls is influenced by these two elements. The above-referenced Pratt & Owen conference paper contains an indication of the relationship between the spectra of signals according to embodiments of the present invention and the magnitude and duration of the steps.

Figure 6:
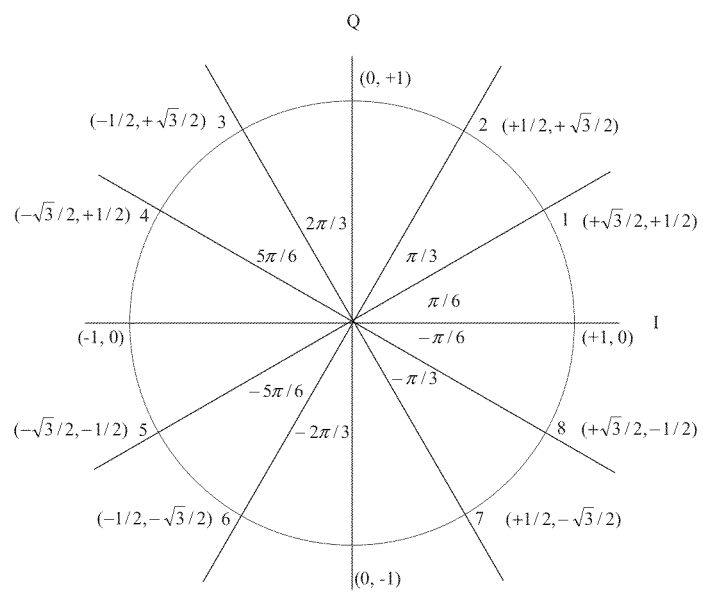
FIG. 6 illustrates phase states for a subcarrier according to embodiments of the present invention.

Referring to FIG. 6, there is shown subcarrier states or amplitudes for I and Q signals for a further BOC8 signal, that is, a binary offset carrier having eight states. It can be appreciated that the eight states can be represented by, or correspond to, subcarrier amplitudes chosen from the set $(-\sqrt{3}/2, -1/2, +1/2, +\sqrt{3}/2)$ ie four states or signal amplitudes rather than the five states or signal amplitudes described above. Therefore, the I and Q components, constructed from the following signal elements such that $\sqrt{(\cos^2\theta+\sin^2\theta)}=1$, that is, $\pm\sqrt{3}/2$ can only occur in conjunction with $\pm1/2$, are as follows:

I phase—$(+1/2, +\sqrt{3}/2, +\sqrt{3}/2, +1/2)$ representing a +1 chip of a ranging code signal I phase—$(-1/2, -\sqrt{3}/2, \sqrt{-3}/2, -1/2)$ representing a -1 chip of a ranging code signal Q phase—$(+\sqrt{3}/2, +1/2, -1/2, \sqrt{-3}/2)$ representing a +1 chip of a ranging code signal Q phase—$(-\sqrt{3}/2, -1/2, +1/2, +\sqrt{3}/2,)$ representing a -1 chip of a ranging code signal.

Figure 7A:
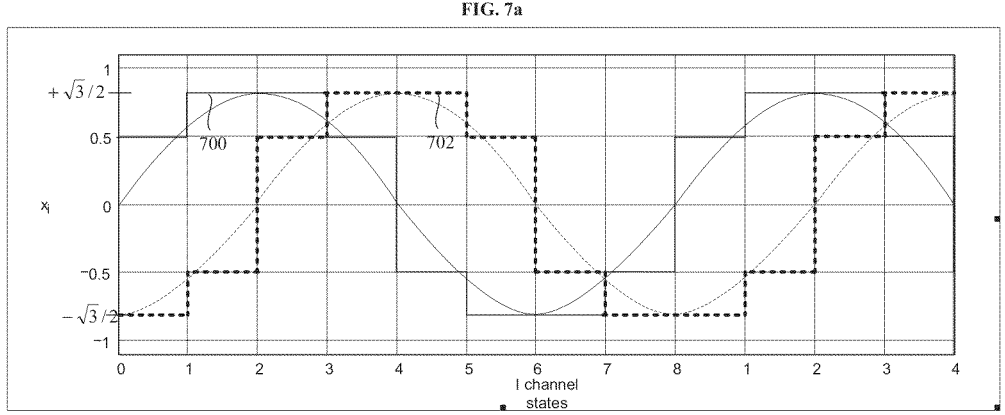
FIGS. 7A and 7B illustrate in phase and quadrature phase subcarriers according to embodiments of the present invention.
Figure 7B:
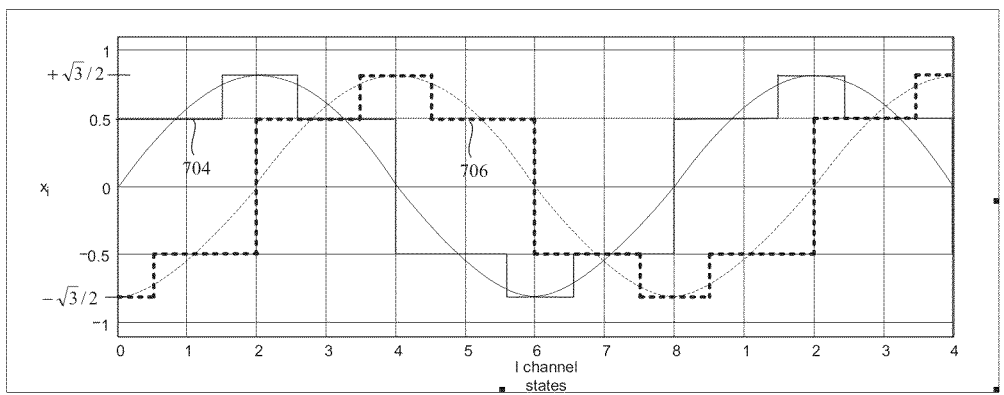

It will be appreciated that the states 1 to 8 shown in FIG. 6 are not equidistantly disposed circumferentially. The transitions between states 2&3, 4&5, 6&7, 8&1 are larger in angular step than the transitions between states 1&2, 3&4, 5&6, 7&8. It will be appreciated that when these states are translated into subcarrier amplitudes, the duration of a given amplitude will depend on the duration or dwell time of a corresponding state, that is, the durations for which the subcarrier remains in any given state may no longer be equal unlike the states of FIG. 4 above. The dwell times are a matter of design choice such as, for example, to minimise the: mean square difference between a stepped waveform and a sinusoid. FIG. 7a illustrates the subcarriers 700 and 702 corresponding to the states shown in FIG. 6. It can be appreciated that the durations of within each state the subcarriers 700 and 702 are equal. The Q channel subcarrier magnitudes will follow substantially the same pattern as described above but phase shifted by $\pi/2$ radians. The subcarrier 702 for the Q channel is shown in dotted form in FIG. 7. It will be appreciated that such subcarriers provide a constant envelope magnitude since $(I^2+Q^2)^{1/2}=1$ for all amplitude combinations. However, referring to FIG. 7b, there is shown a pair of subcarriers 704 and 706 in which the durations at each state are unequal. It will be appreciated that not all amplitude combinations satisfy $(I^2+Q^2)^{1/2}=1$. Therefore, the transmitted signal will not have a constant envelope.

It will be appreciated by those skilled in the art that a stepped half cycle of the subcarrier corresponds to one chip. However, other embodiments can be realised in which other multiples of half cycles correspond to a chip. For example, embodiments can be realised in which two half cycles of a subcarrier correspond to a chip. In such embodiments the signals for the I and Q channels would be I phase—$(+1/2, +\sqrt{3}/2, +\sqrt{3}/2, +1/2, -1/2, -\sqrt{3}/2, -\sqrt{3}/2, -1/2)$ representing a +1 signal I phase—$(-1/2, -\sqrt{3}/2, -\sqrt{3}/2, -1/2, +1/2, +\sqrt{3}/2, +\sqrt{3}/2, +1/2)$ representing a -1 signal Q phase—$(+\sqrt{3}/2, +1/2, -1/2, -\sqrt{3}/2, -\sqrt{3}/2, -1/2, +1/2, +\sqrt{3}/2)$ representing a +1 signal Q phase—$(-\sqrt{3}/2, -1/2, +1/2, +\sqrt{3}/2, +\sqrt{3}/2, +1/2, -1/2, -\sqrt{3}/2)$ representing a -1 signal.

Similarly, embodiments realised using three half cycles per chip would produce

I phase—$(+1/2, +\sqrt{3}/2, +\sqrt{3}/2, +1/2, -1/2, -\sqrt{3}/2, -\sqrt{3}/2, -1/2, +1/2, +\sqrt{3}/2, +\sqrt{3}/2, +1/2)$ representing a +1 signal I phase—$(-1/2, -\sqrt{3}/2, -\sqrt{3}/2, -1/2, +1/2, +\sqrt{3}/2, +\sqrt{3}/2, +1/2, -1/2, -\sqrt{3}/2, -\sqrt{3}/2, -1/2)$ representing a -1 signal Q phase—$(+\sqrt{3}/2, +1/2, -1/2, -\sqrt{3}/2, -\sqrt{3}/2, -1/2, +1/2, +\sqrt{3}/2, +\sqrt{3}/2, +1/2, -1/2, -\sqrt{3}/2)$ representing a +1 signal Q phase—$(-\sqrt{3}/2, -1/2, +1/2, +\sqrt{3}/2, +\sqrt{3}/2, +1/2, -1/2, -\sqrt{3}/2, -\sqrt{3}/2, -1/2, +1/2, +\sqrt{3}/2)$ representing a -1 signal.

One skilled in the art will appreciate that the above can be extended to n half cycles of a subcarrier per ranging code chip.

It will be appreciated that other phases can be used to describe the subcarriers. For example, phase and amplitude components of 16-PSK can be used to create BOC16 subcarriers having 9 levels, assuming that the first state is at (+1,0). Using m-PSK phase states can be used to produce (m+2)/2 level subcarrier signals. Therefore, setting m=2 gives the conventional BPSK and a two-level subcarrier. Setting m=4 provides a 3 level subcarrier, that is, BOC4 modulation, setting m=8 produces a 5 level subcarrier, that is, BOC8 modulation, setting m=16 produces a 9 level subcarrier, which corresponds to BOC16 modulation.

It will be appreciated that several further variations in the assignment of code and data states to the phase locations can be realised. For example, rotation of the states shown in FIG. 4 by 22.5° leads to a reassignment of angles associated with the states from the angles (0°, 45°, 90°, 135°, 180°, 225°, 270°, 315°) to the angles (22.5°, 67.5°, 112.5°, 157.5°, 202.5°, 247.5°, 292.5°, 337.5°). Again, it will be appreciated that this does not cause a change in the modulus of the spectrum and, again, the required number of amplitude levels reduces from 5 to 4, that is, m-PSK can be used to realise [(m+2)/2−1] amplitudes according to appropriate rotation and alignment of the phase states. The resulting waveforms for the I and Q components are built, in this case, from the following signal element sequences:

I phase—(+cos(67.5°), +cos(22.5°), +cos(22.5°), +cos(67.5°)) representing a +1 signal I phase—(−cos(67.5°), −cos(22.5°), −cos(22.5°), −cos(67.5°)) representing a −1 signal Q phase—(+sin(67.5°), +sin(22.5°), −sin(22.5°), −sin(67.5°)) representing a +1 signal Q phase—(−sin(67.5°), −sin(22.5°), +sin(22.5°), +sin(67.5°)) representing a −1 signal.

It should be noted that the I and Q signal element sequences for the cases described above are orthogonal over the duration of one spreading pulse (chip). Clearly, other rotations are possible and will-yield orthogonal signal element sets.

Figure 8:
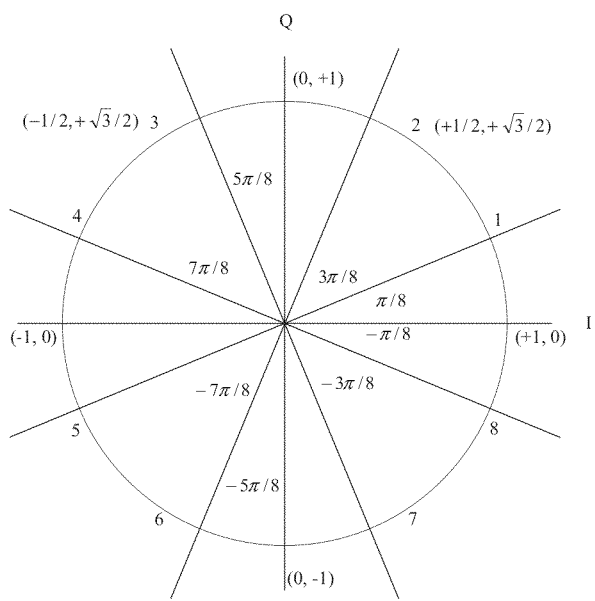
FIG. 8 illustrates phase states of a subcarrier according to an embodiment of the present invention.

An alternative way of representing the above is via a state table. Assume that an embodiment of a BOC8 modulation has been realised with equidistant states and the first state having a phase angle of π/8 radians (22.5°) as shown in FIG. 8, which correspond to the above values. The sequence of phase states required for each I and Q ranging code signal components, assuming that the ranging codes transition substantially simultaneously and a desire to maintain a substantially constant output envelope, that is, the states for the subcarriers would be given by

TABLE 1

Sequence of States for BOC8(x, x) I & Q signal elements

| I  | Q  | t1 | t2 | t3 | t4 |
|----|----|----|----|----|----|
| +1 | +1 | 2  | 1  | 8  | 7  |
| −1 | +1 | 3  | 4  | 5  | 6  |
| +1 | −1 | 7  | 8  | 1  | 2  |
| −1 | −1 | 6  | 5  | 4  | 3  |

It will be appreciated that the subcarrier corresponding to the phase states in Table 1 comprises a half cycle per ranging code chip. Furthermore, the sense of the phasor is clockwise when I and Q are equal and anticlockwise otherwise. It will be apparent that the signal element sequences or state sequences are sections (specifically half cycle sections in the aspect of the invention disclosed above) of a sampled or quantised sinusoid. The concept can, therefore, be extended to include a multiplicity of such samples. Those variants, which appear to be useful, include the cases with samples from a finite number of half cycles, that is, rather than, for example, an I channel value of +1 being represented by the states of 2, 1, 8 and 7, it can be represented using some other number of states such as, for example, 2, 1, 8, 7, 6, 5, 4, 3, 2, 1, 8, 7 ie by three half cycles of the sample or quantised sinusoid. Table 2 illustrates the phase states for such an embodiment and is based on the phase state diagram of FIG. 4 for samples but using three half cycles (or an arbitrary number of half cycles) of the sinusoid waveform. The sinusoid or portion or multiple of half cycles thereof is known as the 'basis waveform'. One skilled in the art realises that other basis waveforms can be used such as, for example, a triangular waveform or a set of mutually orthogonal waveforms.

TABLE 2

Sequence of States for 8-PSK I & Q Signal Elements with 1½ cycles of sub-carrier per chip modulation

| I  | Q  | t1 | t2 | t3 | t4 | t5 | t6 | t7 | t8 | t9 | t10 | T11 | t12 |
|----|----|----|----|----|----|----|----|----|----|----|-----|-----|-----|
| +1 | +1 | 2  | 1  | 8  | 7  | 6  | 5  | 4  | 3  | 2  | 1   | 8   | 7   |
| −1 | +1 | 3  | 4  | 5  | 6  | 7  | 8  | 1  | 2  | 3  | 4   | 5   | 6   |
| +1 | −1 | 7  | 8  | 1  | 2  | 3  | 4  | 5  | 6  | 7  | 8   | 1   | 2   |
| −1 | −1 | 6  | 5  | 4  | 3  | 2  | 1  | 8  | 7  | 6  | 5   | 4   | 3   |

TABLE 3

Sequence of States for 8-PSK I & Q Signal Elements with two half cycles of sub-carrier per chip modulation.

| I  | Q  | t1 | t2 | t3 | t4 | t5 | t6 | t7 | t8 |
|----|----|----|----|----|----|----|----|----|----|
| +1 | +1 | 2  | 1  | 8  | 7  | 6  | 5  | 4  | 3  |
| −1 | +1 | 3  | 4  | 5  | 6  | 7  | 8  | 1  | 2  |
| +1 | −1 | 7  | 8  | 1  | 2  | 3  | 4  | 5  | 6  |
| −1 | −1 | 6  | 5  | 4  | 3  | 2  | 1  | 8  | 7  |

One skilled in the art will appreciated that it is assumed in Tables 1 to 3, that the I and Q chip transitions happen substantially simultaneously and, furthermore, that the I and Q subcarriers take the form of sine and cosine waveforms respectively. However, embodiments can be realised in which the ranging code chip transitions do not occur substantially simultaneously. Furthermore, in circumstances in which the ranging code chip transitions do not occur substantially simultaneously, the subcarriers corresponding to the I and Q ranging code chips can be arranged to take the form of a pair of quantised sine waves.

It will seen that there are 4 time samples for each ½ cycle of the waveform. The stepped sinusoidal waveform may be viewed as sub-carrier modulation of the basic spreading waveform. The number of time samples and independent information bearing channels is related to the number of phase states, which the carrier signal has in its representation. Although the examples above have used phase states that are 'powers of 2', embodiments can be realised in which some other number is used. For example, a 6-PSK carrier signal can be used to carry 2 independent information bearing binary channels. In this case only 3 signal element samples are required per transmitted code chip.

One skilled in the art appreciates that the replacement of the stepped sinusoid with a rectangular wave with duration of each element equal to a ½ cycle of the sinusoid is well known within the art. As indicated above, it is known as 'Binary Offset Carrier' modulation. There are usually 2 further attributes associated with the BOC description, which relate to the frequency of the code chipping rate and to the frequency of the offset sub-carrier. BOC(2,2) consequently is interpreted as a waveform with a 2.046 MHz chipping rate and a 2.046 MHz offset sub-carrier. This arrangement has exactly two ½ cycles of the sub-carrier signal for each code element (chip).

A further aspect of embodiments of the present invention relates to using a set of subcarriers to modulate ranging codes, with at least one or more, or all, of the subcarriers being multilevel waveforms. One skilled in the art may think of such embodiments as modulation of the subcarrier signal by a further subcarrier signal. The resulting signal transmitted by an ith satellite or system having a carrier frequency of $\omega_i$, for an additional subcarrier, would have the form:

$$S_i(t) = A_m sc_{jm}(t) sc_{im}(t) m_i(t) d_i(t) \cos(\omega_i t) + A_C sc_{jg}(t) sc_{ig}(t) g_i(t) d_i(t) \sin(\omega_i t) = I_{Si}(t) + Q_{Si}(t)$$

where $sc_{im}(t)$ and $sc_{jm}(t)$ represent first and second subcarrier signals respectively first ranging codes such as, for example, M-codes; and $sc_{ig}(t)$ and $sc_{jg}(t)$ represent first and second subcarrier signals second ranging codes such as, for example, Gold codes.

It should be noted that embodiments can be realised in which $sc_{im}(t)$ and $sc_{ig}(t)$ are the same or different. Similarly, embodiments can be realised in which $sc_{jm}(t)$ and $sc_{jg}(t)$ are the same of different.

$$S_i(t) = A_m \prod_{j=1}^{n} sc_{ijm}(t) m_i(t) d_i(t) \cos(\omega_i t) + A_C \prod_{j=1}^{l} sc_{ijg}(t) g_i(t) d_i(t) \sin(\omega_1 t) = I_{Si}(t) + Q_{Si}(t),$$

where $$\prod_{j=1}^{n} sc_{ijm}(t) \text{ and } \prod_{j=1}^{l} sc_{ijg}(t)$$

represents the product of the subcarriers for the first and second ranging codes such as, for example, the m and Gold codes.

Although it is possible to use more than one subcarrier, practical embodiments will typically use 2 subcarriers. Modulation using a pair of subcarriers is known as Double Binary Offset Carrier (DBOC) modulation. Modulation using three subcarriers is known as Triple Binary Offset Carrier (TBOC) modulation and so on such that modulation using a n-tuple of subcarriers is known as N-tuple Binary Offset Carrier (NBOC). As mentioned above, one or more than one of the subcarriers may be stepped, that is, having magnitudes related to respective phase states.

Figure 9:
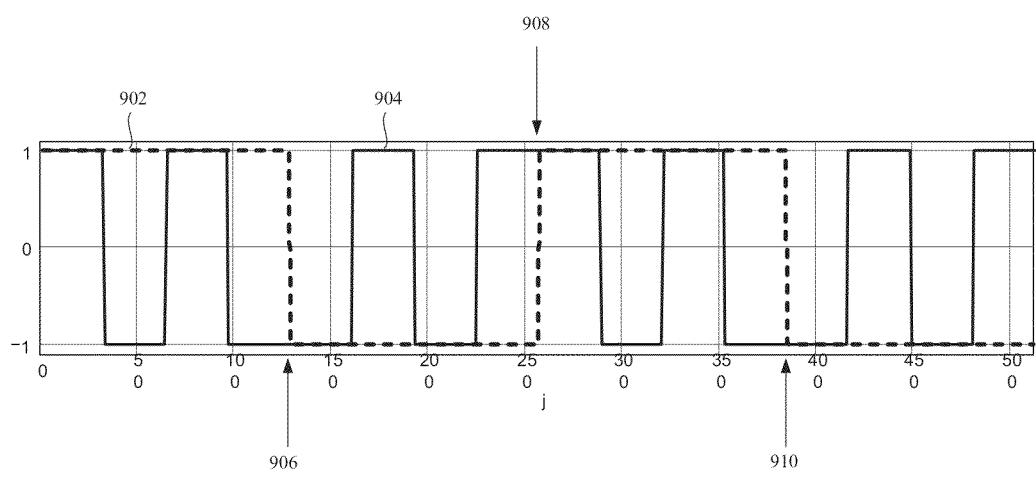
FIG. 9 shows subcarriers according to embodiments of the present invention.

As examples of this aspect of the invention, FIG. 9 illustrates a pair of waveforms 900. In FIG. 9, as an illustration of the NBOC invention, the subcarrier basis waveforms are assumed to be binary and only a single subcarrier waveform 902 is shown. The time duration in FIG. 9 is 512 samples and exactly matches the duration of one code element duration (chip). The first subcarrier 902 contains 4 half cycles of a subcarrier per ranging code chip, as illustrated by the dashed waveform. If this was the only sub-carrier component, the modulation would be a BOC(2x,x) type, where x is the frequency of the code rate (chipping rate). However, it can be appreciated that a second sub-carrier (not shown) having 16 half cycles per 512 samples has been used to produce the modulated waveform 904 to be combined with the carrier of the satellite signal. The modulated waveform is shown by the solid curve. As a result of modulation (multiplication) of the two subcarriers, the resulting waveform 904 has phase reversals for the second subcarrier 904 whenever there is a sign reversal in the first subcarrier 902. This is clearly evident in FIG. 9 at points 906, 908 and 910, where the transitions of the second subcarrier (not shown) would have been opposite. The resulting modulation is denoted Double BOC, or DBOC. In the case of FIG. 9, the modulation is DBOC(8x,(2x,x)), that is, there are 8 half cycles of the second subcarrier per chip of the ranging code (not shown). The main energy is concentrated around frequencies ±8x from the carrier signal, with a BOC like double humped spectrum.

Figure 10:
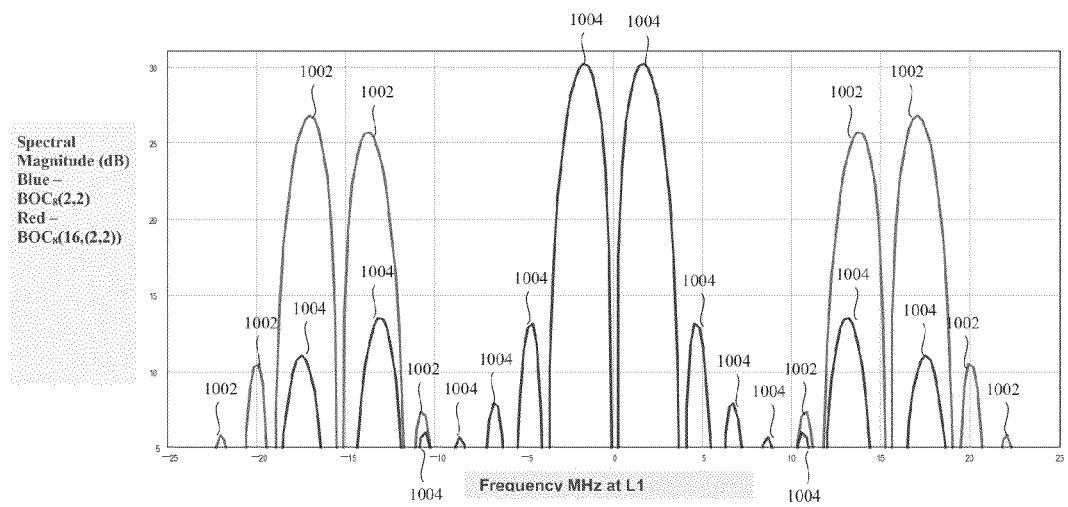
FIG. 10 depicts power spectra of subcarriers according to embodiments of the present invention.
Figure 11:
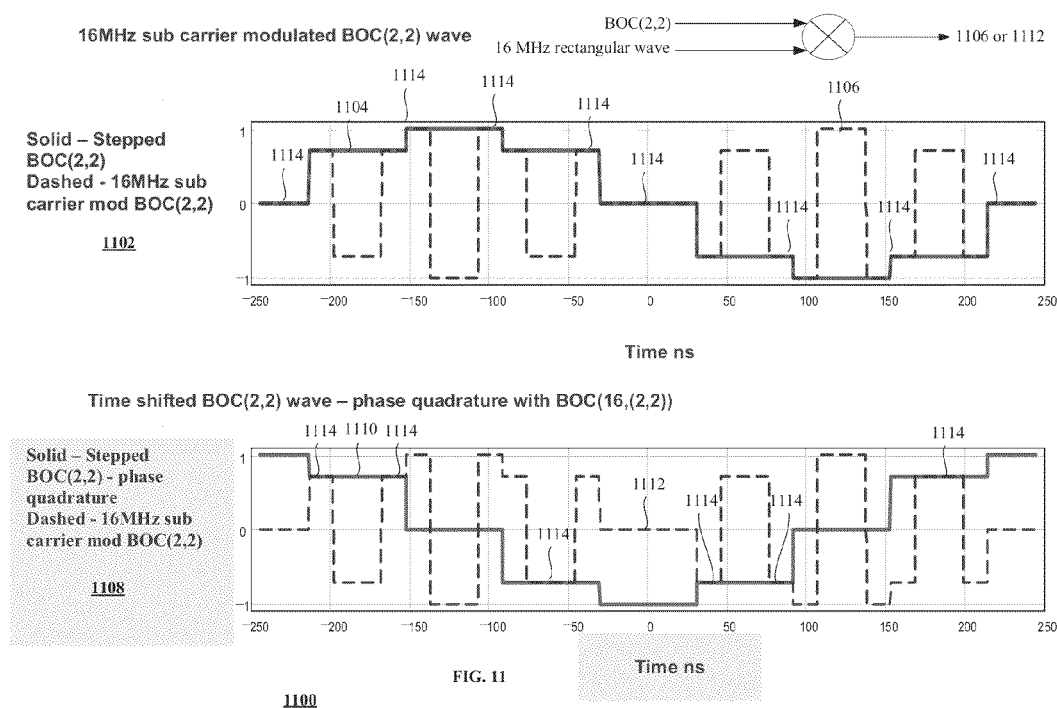
FIG. 11 illustrates subcarriers according to embodiments of the present invention.

Referring to FIG. 10, there is shown a pair of power spectra 1000. A first power spectrum 1002 relates to a DBOC8(16,(2,2)) signal. It will be appreciated that at least one of the first and second subcarriers used to create the DBOC8(16,(2,2)) signal comprised amplitudes derived from 8 corresponding phase states. In the specific embodiment shown, the first subcarrier was the multi-level signal. It will be appreciated that the nomenclature for representing DBOC modulation or subcarriers is DBOCa(b,c(d,e)), where a and c represent the number of phase states, that is, amplitudes, of the subcarriers having frequencies b and d respectively. The second spectrum 1004 relates to a BOC8(2,2) signal. The spectra shown have been made using a previous aspect of the invention, that is the use of multilevel subcarriers or subcarriers having more than two phase states, in combination with the Double BOC concept. The waveforms for I & Q modulations for the spectrum of FIG. 10 are shown in FIG. 11. Referring to FIG. 11 there is shown a pairs 1100 of waveforms. The first pair of waveforms 1102, representing the I channel of the spreading waveform, comprises a stepped or multi-level BOC(2,2) signal 1104, represented by the solid line, and a 16 Mhz subcarrier modulated BOC(2,2) signal 1106, represented by the dashed line. It will be appreciated that the 16 MHz subcarrier modulated BOC(2,2) signal has been produced by multiplying the BOC8(2,2), that is, stepped BOC(2,2) signal, by a 16 MHz rectangular waveform (not shown) having amplitudes of ±1. The second waveform 1108, representing the Q channel, comprises a quadrature BOC(2,2) signal 1110 together with a 16 MHz subcarrier modulated BOC(2,2) signal 1112. It can be appreciated that the first subcarrier 1104 or 1110 is a subcarrier according to an embodiment of the present invention described above whereas the second sub-carrier (not shown) in both cases are conventional binary rectangular waveforms, that is, conventional subcarriers. It can be appreciated that there are regions 1114 of overlap between the two BOC(2,2) subcarriers 1104 and 1110 and their resulting products, that is, 16 MHz subcarrier modulated BOC(2,2) signals 1106 and 1112. In the regions of overlap 1114, the waveforms have the same amplitude profile.

An advantage of the embodiments of the signals shown in FIG. 11 is that the I channel or component has been produced or represents DBOC8 modulation or signal whereas the Q channel has been produced using or represents BOC8 modulation. However, this arrangement still preserves or provides a substantially constant envelope carrier signal to be emitted from the satellite.

Figure 12:
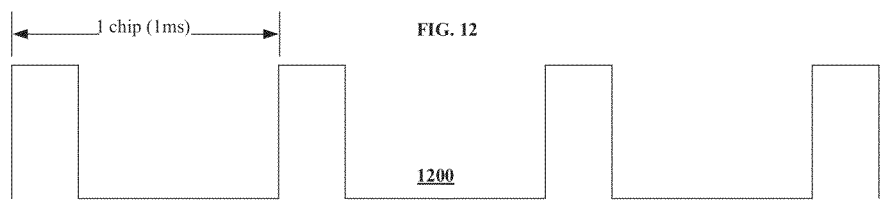
FIG. 12 shows an alternative subcarrier waveform according to an embodiment of the present invention.

Embodiments of the present invention have been described with reference to the subcarrier signals being periodic. However, embodiments can be realised in which the subcarrier signal comprises a pseudorandom noise signal. Furthermore, embodiments can be realised in which the shape of the subcarrier takes a form other than a stepped, that is, a multilevel wave or quantised approximation of a sinusoidal waveform. For example, multilevel-pulsed waveforms, multilevel-periodic waveforms or multilevel-aperiodic waveforms, could be used such as the signal shown in FIG. 12 according to the influence one skilled in the art wishes the resulting modulation to have on the power spectrum of the transmitted signal and/or any appropriate measure of interference such as, for example, SSC or self-SSCs.

Figure 13:
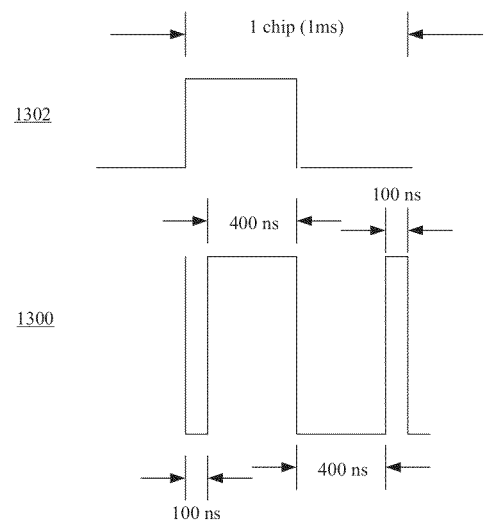
FIG. 13 illustrates a further alternative waveform according to embodiments of the present invention.

Referring to FIG. 13, there is shown a subcarrier waveform 1300 according to a further embodiment of the present invention together with one chip 1302 of a code or other waveform such as, for example, another subcarrier. It can be appreciated that the subcarrier comprises a first portion of a BOC(5,1) waveform, in the 100 ns sections, combined with portions of a BOC(1,1) waveform, in the 400 ns portions, to produce an overall subcarrier. It will be appreciated that the spectra of the BOC(5,1) waveform will have a peak at 5*1.023 MHz and the BOC(1,1) waveform will have a peak at 1*1.023 MHz. Therefore, one skilled in the art appreciated that selectively combining the BOC subcarriers allows one skilled in the art to position or relocate the peaks of the overall subcarrier. Again, it can be appreciated that the subcarrier used, for example, to modulate the ranging codes is derived from more than one subcarrier. Although the signal described in relation to FIG. 13 has been derived from BOC(5,1) and BOC(1,1) subcarriers, embodiments can be realised in which other combinations of BOC subcarriers are used, In effect, the BOC(5,1) and BOC(1,1) signal have been multiplexed or selectively combined to produce an overall subcarrier signal. It will be appreciated that other sequences for the subcarriers can be realised according to a desired effect upon the power spectrum of a transmitted signal. For example, a subcarrier can be realised using a pseudorandom sequence as sub-carrier instead of the stepped modulations. The use of additional sequences to that of the main spreading code has hitherto been limited to use as a tiered code, which changes state after every complete code repetition interval. The GPS L5 codes are constructed in this manner using Neumann Hoffman sequences of length 10 or 20 to extend a 1 ms code (of 10230 chips or elements) to 10 ms or 20 ms. The use of a subcode chip interval has not previously been considered. A complete sequence (a sub-sequence) has a duration of one code chip, or at most a plurality, of code chips. It fulfills a similar role to the sub-carrier modulation as previously described in that it controls the spectrum of the emissions. One feature of such a sub-sequence is that such sequences may be chosen to be common amongst a satellite constellation or a sub-set of the constellation. One such subset might be a group of ground transmitters providing a local element or augmentation to the space segment of the system. For example, subcarrier amplitudes can be realised that have the sequence –++++−−−−+ in 10 subchip intervals or other sequence of +1's and −1's per ranging code chip or other subcarrier chip according to the desired effect on spectrum of the resulting signal. Examples such as the 7 subchip interval sequences would include ++−−−−−, +++−−−−, +−+−+−−, and can be chosen to provide similar control over the emitted spectrum.

Figure 14:
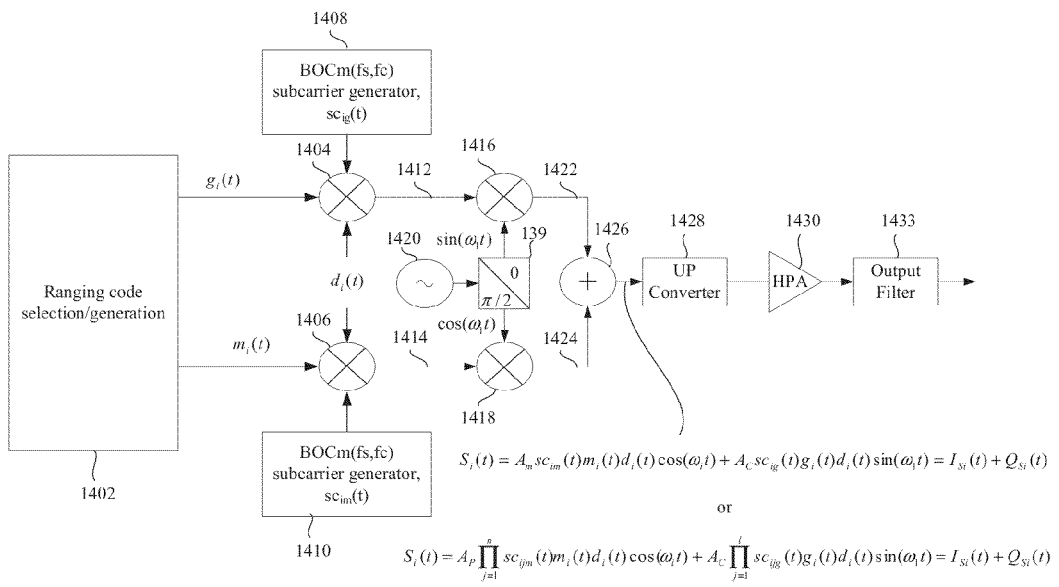
FIG. 14 illustrates, schematically, a transmitter using subcarriers according to embodiments of the present invention.

Referring to FIG. 14, there is shown, schematically, a transmitter 1400 according to an embodiment of the present invention. The transmitter 1400 comprises means 1402, that is, a generator, for generating or selecting the ranging codes for transmission. It will be appreciated by those skilled in the art that such ranging code may be generated by, for example, shift register implementations. It can be appreciated that the ranging code selection and/or generation means 1402 is illustrated as producing $g_i(t)$ and $p_i(t)$. These codes are fed to respective mixers 1404 and 1406. The mixers 1404 and 1406 are arranged to combine the ranging codes with subcarriers according to embodiments of the present invention. Respective subbarrier generators 1408 and 1410 generate the subcarriers. Optionally, a data signal, $d_i(t)$, is also preferably mixed with the ranging codes and subcarriers. The duration of one bit of the data signal is normally an integer multiple of the code repetition interval. For example, in GPS CA code, it is 20 times the 1 ms code repetition interval, that is, the data rate is 50 bps. The mixed signals 1412 and 1414 are fed to a further pair of mixers 1416 and 1418, where they are mixed with in-phase and quadrature phase signals produced via an oscillator and phase shifter assembly 1420. The further mixed signals 1422 and 1424 are combined, via a combiner 1426, and output for subsequent up conversion by an appropriate up converter 1428. The output from the up converter 1428 is fed to a high-power amplifier 1430 and then filtered by an appropriate filter 1433 for subsequent transmission by, for example, a satellite or other device arranged to emit or transmit the ranging codes.

Figure 15:
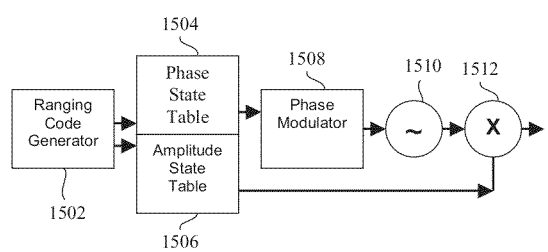
FIG. 15 illustrates a further embodiment of a transmitter according to an embodiment.

Referring to FIG. 15, there is shown a schematic representation of a modulation system 1500 according to an embodiment. The system 1500 comprises a ranging code generator 1502 for producing a ranging code. The ranging code is fed to a first lookup table 1504 comprising phase states and a second lookup table 1506 comprising amplitude states. The output of the phase state lookup table 1504 is used to drive a phase modulator 1508, which, in turn, produces a voltage signal to control the phase of a voltage controlled oscillator 1510. The output of the oscillator 1510 is combined, via, a combiner 1512 such as, for example, a gain controlled amplifier or multiplier, with a signal output from the amplitude state table 1506 to produce a subcarrier having the appropriate characteristics.

Although the above embodiments have been described with reference to maintaining a substantially constant signal envelope, embodiments are not limited thereto. Embodiments can be realised in which variable modulus signal envelopes are used. It will be appreciated that the constraints described above, which are aimed at preserving unitary magnitude of $(I^2+Q^2)^{1/2}$, need not necessary apply.

The above embodiments have been described with reference to the I and Q channels having the same chipping rates. However, embodiments are not limited to such arrangements. Embodiments can be realised in which different chipping rates are used.

Although embodiments of the present invention have been described with reference to the L1 and L2 frequencies, embodiments are not limited to such arrangements. Embodiments can be realised in which other frequencies or frequency bands can be used according to the requirements of the system using the invention. For example, the lower L band (ie E5a and E5b), the middle (ie E6) and upper L-band (ie E2-L1-E1) can also benefit from embodiments of the present invention. It will be appreciated that such embodiments may use signals having at least three components rather than the two components described above.

Furthermore, embodiments of the present invention have been described with reference to standard BOC. However, one skilled in the art appreciated that embodiments can also be realised using Alternative BOC.

Furthermore, it will be appreciated that embodiments can be realised in which the number of half cycles of a subcarrier per chip of a code can be at least one of odd, even, an integer multiple or a non-integer multiple of the chip, that is, there is a rational number relationship between the number of subcarrier half cycles and the chip duration.

Embodiments of the present invention described above have focused on the transmission side of the invention, that is, upon the generation, modulation and transmission of ranging codes combined with a subcarrier or subcarriers. However, one skilled in the art appreciated that a converse system and method are required to receive and process the signals. Once one skilled in the art has designed a system for transmitting such signals, designing an appropriate receiver is merely the converse of the transmit operations. Therefore, embodiments of the present invention also relate to a receiver for processing signals such as those described above.

The reader's attention is directed to all papers and, documents that are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of controlling a power spectrum of a navigation transmission signal in a navigation system, the navigation transmission signal comprising a carrier signal, a ranging code, a data signal, and at least one stepped subcarrier modulation signal, the method comprising the step of modulating the carrier signal by the at least one stepped subcarrier modulation signal, the data signal, and the ranging code to generate the navigation transmission ranging signal; wherein the at least one stepped subcarrier modulation signal comprises a number, m, of amplitude levels, where m>2, the amplitude levels being arranged to constrain the power spectrum of the navigation transmission signal in a predetermined manner.

2. The method as claimed in claim 1, wherein in is selected from at least one of 3, 4, 5, 6, 7, 8 or 9.

3. The method as claimed in claim 1, wherein at least one of the at least one stepped subcarrier modulation signal approximates or is derived from a predetermined basis waveform.

4. The method as claimed in claim 3 in which the basis waveform is at least one of a sine wave, cosine wave, triangular waveform.

5. The method as claimed in claim 3 wherein the basis waveform is selected according to desired power distribution characteristics of the navigation transmission signal.

6. The method as claimed in claim 1, wherein the at least one stepped subcarrier modulation signal comprises at least two mutually orthogonal stepped subcarrier modulation signals.

7. The method as claimed in claim 6, wherein the at least two stepped subcarrier modulation signals comprises a pair of subcarriers having a predetermined phase relationship.

8. The method as claimed in claim wherein the at least one stepped subcarrier modulation signal comprises an in-phase subcarrier and a quadrature phase subcarrier.

9. The method as claimed in claim 8, further comprising determining from said number, m, of amplitude levels respective multiple amplitudes of the in-phase and quadrature phase subcarriers to maintain a substantially constant navigation transmission signal envelope.

10. The method as claimed in claim 1, further comprising the steps of deriving from said number, m, of amplitude levels the amplitudes associated with the at least one stepped subcarrier modulation signal from a plurality of phase states.

11. The method as claimed in claim 10, in which the phase states are equally angularly distributed around a unit circle.

12. The method as claimed in claim 1, wherein durations of the amplitudes of said number, m, of amplitude levels of the at least one stepped subcarrier modulation signal are substantially equal.

13. The method as claimed in claim 1, wherein the durations of at least a pair of amplitudes of said number, m, of amplitude levels of the at least one stepped subcarrier modulation signal are different.

14. The method as claimed in claim 12, wherein the durations are quantized according to an associated clock signal.

15. The method of claim 1, wherein the at least one subcarrier modulation signal comprises at least a pair of stepped subcarrier modulation signals resolved according to mutually orthogonal axes.

16. The method of claim 15, wherein each subcarrier modulation signal of the pair of subcarrier modulation signals has a respective ranging signal.

17. The method of claim 15, wherein dwell times of at least some of the amplitudes of the at least one stepped subcarrier modulation signal are unequal.

18. The method of claim 17, wherein a first group of the amplitudes have a first dwell time and a second group of the amplitudes have a second dwell time.

19. The method as claimed in claim 15, wherein the dwell tunes are quantized according to a clock.

* * * * *